(12) United States Patent
Kurganov et al.

(10) Patent No.: US 9,451,084 B2
(45) Date of Patent: *Sep. 20, 2016

(54) ROBUST VOICE BROWSER SYSTEM AND VOICE ACTIVATED DEVICE CONTROLLER

(75) Inventors: Alexander Kurganov, Buffalo Grove, IL (US); Valery Zhukoff, Deerfield, IL (US)

(73) Assignee: Parus Holdings, Inc., Buffalo Grove, IL (US)

(*) Notice: Subject to any disclaimer, the term of this patent is extended or adjusted under 35 U.S.C. 154(b) by 334 days.

This patent is subject to a terminal disclaimer.

(21) Appl. No.: 13/462,819

(22) Filed: May 3, 2012

(65) Prior Publication Data

US 2012/0215545 A1  Aug. 23, 2012

Related U.S. Application Data

(63) Continuation of application No. 12/973,475, filed on Dec. 20, 2010, now Pat. No. 8,185,402, which is a continuation of application No. 12/030,556, filed on Feb. 13, 2008, now Pat. No. 7,881,941, which is a (Continued)

(51) Int. Cl.
*H04M 3/493* (2006.01)
*G10L 15/26* (2006.01)
*G06F 3/16* (2006.01)

(52) U.S. Cl.
CPC ............ *H04M 3/4938* (2013.01); *G10L 15/26* (2013.01); *G06F 3/16* (2013.01); *H04M 2201/39* (2013.01); *H04M 2201/40* (2013.01); *Y10S 707/99942* (2013.01); *Y10S 707/99943* (2013.01)

(58) Field of Classification Search
CPC ............................ G06F 3/167; G06F 17/3043
USPC ................................................ 704/275, 270.1
See application file for complete search history.

(56) References Cited

U.S. PATENT DOCUMENTS

| 174,465 A | 3/1876 | Bell |
| 3,728,486 A | 4/1973 | Kraus |
| 4,058,838 A | 11/1977 | Crager et al. |
| 4,100,377 A | 7/1978 | Flanagan |

(Continued)

FOREIGN PATENT DOCUMENTS

| CA | 1329852 | 5/1994 |
| EP | 0 572 544 | 9/1996 |

(Continued)

OTHER PUBLICATIONS

"A PABX that Listens and Talks", Speech Technology, Jan./Feb. 1984, pp. 74-79.

(Continued)

*Primary Examiner* — Susan McFadden
(74) *Attorney, Agent, or Firm* — Patent Law Works LLP

(57) ABSTRACT

The present invention relates to a system for acquiring information from sources on a network, such as the Internet. A voice browsing system maintains a database containing a list of information sources, such as web sites, connected to a network. Each of the information sources is assigned a rank number which is listed in the database along with the record for the information source. In response to a speech command received from a user, a network interface system accesses the information source with the highest rank number in order to retrieve information requested by the user.

15 Claims, 4 Drawing Sheets

Related U.S. Application Data continuation of application No. 11/409,703, filed on Apr. 24, 2006, now Pat. No. 7,386,455, which is a continuation of application No. 10/821,690, filed on Apr. 9, 2004, now Pat. No. 7,076,431, which is a continuation of application No. 09/776,996, filed on Feb. 5, 2001, now Pat. No. 6,721,705.

(60) Provisional application No. 60/233,068, filed on Sep. 15, 2000, provisional application No. 60/180,344, filed on Feb. 4, 2000.

(56) References Cited

U.S. PATENT DOCUMENTS

| | | | |
|---|---|---|---|
| 4,158,750 A * | 6/1979 | Sakoe et al. | 704/251 |
| 4,313,035 A | 1/1982 | Jordan et al. | |
| 4,327,251 A | 4/1982 | Fomenko et al. | |
| 4,340,783 A | 7/1982 | Sugiyama et al. | |
| 4,340,797 A * | 7/1982 | Takano et al. | 219/707 |
| 4,340,800 A * | 7/1982 | Ueda et al. | 219/714 |
| 4,371,752 A | 2/1983 | Matthews et al. | |
| 4,481,574 A | 11/1984 | DeFino et al. | |
| 4,489,438 A | 12/1984 | Hughes | |
| 4,500,751 A | 2/1985 | Darland et al. | |
| 4,513,390 A | 4/1985 | Walter et al. | |
| 4,523,055 A | 6/1985 | Hohl et al. | |
| 4,549,047 A | 10/1985 | Brian et al. | |
| 4,584,434 A | 4/1986 | Hashimoto | |
| 4,585,906 A | 4/1986 | Matthews et al. | |
| 4,596,900 A | 6/1986 | Jackson | |
| 4,602,129 A | 7/1986 | Matthews et al. | |
| 4,635,253 A | 1/1987 | Urui et al. | |
| 4,652,700 A | 3/1987 | Matthews et al. | |
| 4,696,028 A | 9/1987 | Morganstein et al. | |
| 4,713,837 A | 12/1987 | Gordon | |
| 4,747,127 A | 5/1988 | Hansen et al. | |
| 4,748,656 A | 5/1988 | Gibbs et al. | |
| 4,755,932 A | 7/1988 | Diedtrich | |
| 4,757,525 A | 7/1988 | Matthews et al. | |
| 4,761,807 A | 8/1988 | Matthews et al. | |
| 4,763,317 A | 8/1988 | Lehman et al. | |
| 4,769,719 A | 9/1988 | Endo | |
| 4,771,425 A | 9/1988 | Baran et al. | |
| 4,776,016 A | 10/1988 | Hansen | |
| 4,782,517 A | 11/1988 | Bernardis et al. | |
| 4,792,968 A | 12/1988 | Katz | |
| 4,799,144 A | 1/1989 | Parruck et al. | |
| 4,809,321 A | 2/1989 | Morganstein et al. | |
| 4,811,381 A | 3/1989 | Woo et al. | |
| 4,837,798 A | 6/1989 | Cohen et al. | |
| 4,847,891 A | 7/1989 | Kotani | |
| 4,850,012 A | 7/1989 | Mehta et al. | |
| 4,852,149 A | 7/1989 | Zwick et al. | |
| 4,852,170 A | 7/1989 | Bordeaux | |
| 4,866,758 A | 9/1989 | Heinzelmann | |
| 4,873,719 A | 10/1989 | Reese | |
| 4,879,743 A | 11/1989 | Burke et al. | |
| 4,893,333 A | 1/1990 | Baran et al. | |
| 4,893,335 A | 1/1990 | Fuller et al. | |
| 4,903,289 A | 2/1990 | Hashimoto | |
| 4,903,291 A | 2/1990 | Tsurufuji et al. | |
| 4,905,273 A | 2/1990 | Gordon et al. | |
| 4,907,079 A | 3/1990 | Turner et al. | |
| 4,918,722 A | 4/1990 | Duehren et al. | |
| 4,922,518 A | 5/1990 | Gordon et al. | |
| 4,922,520 A | 5/1990 | Bernard et al. | |
| 4,922,526 A | 5/1990 | Morganstein et al. | |
| 4,926,462 A | 5/1990 | Ladd et al. | |
| 4,930,150 A | 5/1990 | Katz | |
| 4,933,966 A | 6/1990 | Hird et al. | |
| 4,935,955 A | 6/1990 | Neudorfer | |
| 4,935,958 A | 6/1990 | Morganstein et al. | |
| 4,941,170 A | 7/1990 | Herbst | |
| 4,942,598 A | 7/1990 | Davis | |
| 4,953,204 A | 8/1990 | Cuschleg, Jr. et al. | |
| 4,955,047 A | 9/1990 | Morganstein et al. | |
| 4,956,835 A | 9/1990 | Grover | |
| 4,959,854 A | 9/1990 | Cave et al. | |
| 4,967,288 A | 10/1990 | Mizutori et al. | |
| 4,969,184 A | 11/1990 | Gordon et al. | |
| 4,972,462 A | 11/1990 | Shibata | |
| 4,974,254 A | 11/1990 | Perine et al. | |
| 4,975,941 A | 12/1990 | Morganstein et al. | |
| 4,985,913 A | 1/1991 | Shalom et al. | |
| 4,994,926 A | 2/1991 | Gordon et al. | |
| 4,996,704 A | 2/1991 | Brunson | |
| 5,003,575 A | 3/1991 | Chamberlin et al. | |
| 5,003,577 A | 3/1991 | Ertz | |
| 5,008,926 A | 4/1991 | Misholi | |
| 5,020,095 A | 5/1991 | Morganstein et al. | |
| 5,027,384 A | 6/1991 | Morganstein | |
| 5,029,196 A | 7/1991 | Morganstein | |
| 5,036,533 A | 7/1991 | Carter et al. | |
| 5,054,054 A | 10/1991 | Pessia et al. | |
| 5,065,254 A | 11/1991 | Hishida | |
| 5,086,385 A | 2/1992 | Launey et al. | |
| 5,095,445 A | 3/1992 | Sekiguchi | |
| 5,099,509 A | 3/1992 | Morganstein et al. | |
| 5,109,405 A | 4/1992 | Morganstein | |
| 5,128,984 A | 7/1992 | Katz | |
| 5,131,024 A | 7/1992 | Pugh et al. | |
| 5,133,004 A | 7/1992 | Heileman, Jr. et al. | |
| 5,145,452 A | 9/1992 | Chevalier | |
| 5,146,452 A | 9/1992 | Pekarske | |
| 5,166,974 A | 11/1992 | Morganstein et al. | |
| 5,179,585 A | 1/1993 | MacMillan, Jr. et al. | |
| 5,193,110 A | 3/1993 | Jones et al. | |
| 5,195,086 A | 3/1993 | Baumgartner et al. | |
| 5,233,600 A | 8/1993 | Pekarske | |
| 5,243,643 A | 9/1993 | Sattar et al. | |
| 5,243,645 A | 9/1993 | Bissell et al. | |
| 5,249,219 A | 9/1993 | Morganstein et al. | |
| 5,255,305 A | 10/1993 | Sattar | |
| 5,263,084 A | 11/1993 | Chaput et al. | |
| 5,276,729 A | 1/1994 | Higuchi et al. | |
| 5,287,199 A | 2/1994 | Zoccolillo | |
| 5,291,302 A | 3/1994 | Gordon et al. | |
| 5,291,479 A | 3/1994 | Vaziri et al. | |
| 5,303,298 A | 4/1994 | Morganstein et al. | |
| 5,307,399 A | 4/1994 | Dai et al. | |
| 5,309,504 A | 5/1994 | Morganstein et al. | |
| 5,325,421 A | 6/1994 | Hou et al. | |
| 5,327,486 A | 7/1994 | Wolff et al. | |
| 5,327,529 A | 7/1994 | Fults et al. | |
| 5,329,578 A | 7/1994 | Brennan et al. | |
| 5,333,266 A | 7/1994 | Boaz et al. | |
| 5,347,574 A | 9/1994 | Morganstein | |
| 5,355,403 A | 10/1994 | Richardson, Jr. et al. | |
| 5,359,598 A | 10/1994 | Steagall et al. | 704/275 |
| 5,365,524 A | 11/1994 | Hiller et al. | |
| 5,365,574 A | 11/1994 | Hunt et al. | |
| 5,375,161 A | 12/1994 | Fuller et al. | |
| 5,384,771 A | 1/1995 | Isidoro et al. | |
| 5,404,231 A | 4/1995 | Bloomfield | |
| 5,408,526 A | 4/1995 | McFarland et al. | |
| 5,414,754 A | 5/1995 | Pugh et al. | |
| 5,416,834 A | 5/1995 | Bales et al. | |
| 5,426,421 A | 6/1995 | Gray | |
| 5,432,845 A | 7/1995 | Burd et al. | |
| 5,436,963 A | 7/1995 | Fitzpatrick et al. | |
| 5,459,584 A | 10/1995 | Gordon et al. | |
| 5,463,684 A | 10/1995 | Morduch et al. | |
| 5,475,791 A | 12/1995 | Schalk et al. | |
| 5,479,487 A | 12/1995 | Hammond | |
| 5,495,484 A | 2/1996 | Self et al. | |
| 5,497,373 A | 3/1996 | Hulen et al. | |
| 5,499,288 A | 3/1996 | Hunt et al. | |
| 5,515,427 A | 5/1996 | Carlsen et al. | |
| 5,517,558 A | 5/1996 | Schalk | |
| 5,526,353 A | 6/1996 | Henley et al. | |
| 5,533,115 A | 7/1996 | Hollenbach et al. | |
| 5,537,461 A | 7/1996 | Bridges et al. | |
| 5,555,100 A | 9/1996 | Bloomfield et al. | |
| 5,559,611 A | 9/1996 | Bloomfield et al. | |

(56) References Cited

U.S. PATENT DOCUMENTS

| | | | |
|---|---|---|---|
| 5,559,859 A | 9/1996 | Dai et al. |
| 5,566,236 A | 10/1996 | MeLampy et al. |
| 5,603,031 A | 2/1997 | White et al. |
| 5,608,786 A | 3/1997 | Gordon |
| 5,610,910 A | 3/1997 | Focsaneanu et al. |
| 5,610,970 A | 3/1997 | Fuller et al. |
| 5,611,031 A | 3/1997 | Hertzfeld et al. |
| 5,630,079 A | 5/1997 | McLaughlin |
| 5,652,789 A | 7/1997 | Miner et al. |
| 5,657,376 A | 8/1997 | Espeut et al. |
| 5,659,597 A | 8/1997 | Bareis et al. |
| 5,666,401 A | 9/1997 | Morganstein et al. |
| 5,675,507 A | 10/1997 | Bobo, II |
| 5,675,811 A | 10/1997 | Broedner et al. |
| 5,689,669 A | 11/1997 | Lynch et al. |
| 5,692,187 A | 11/1997 | Goldman et al. |
| 5,699,486 A | 12/1997 | Tullis et al. |
| 5,712,903 A | 1/1998 | Bartholomew et al. |
| 5,719,921 A | 2/1998 | Vysotsky et al. |
| 5,721,908 A | 2/1998 | Lagarde et al. |
| 5,724,408 A | 3/1998 | Morganstein |
| 5,737,395 A | 4/1998 | Irribarren |
| 5,742,596 A | 4/1998 | Baratz et al. |
| 5,742,905 A | 4/1998 | Pepe et al. |
| 5,752,191 A | 5/1998 | Fuller et al. |
| 5,758,322 A | 5/1998 | Rongley |
| 5,761,294 A | 6/1998 | Shaffer et al. |
| 5,764,639 A | 6/1998 | Staples et al. |
| 5,764,736 A | 6/1998 | Shachar et al. |
| 5,764,910 A | 6/1998 | Shachar |
| 5,774,860 A | 6/1998 | Bayya et al. |
| 5,787,298 A | 7/1998 | Broedner et al. |
| 5,793,993 A | 8/1998 | Broedner et al. |
| 5,794,205 A | 8/1998 | Walters |
| 5,796,791 A | 8/1998 | Polcyn |
| 5,799,063 A | 8/1998 | Krane |
| 5,799,065 A | 8/1998 | Junqua et al. |
| 5,809,282 A | 9/1998 | Cooper et al. |
| 5,809,481 A | 9/1998 | Baron et al. |
| 5,812,796 A | 9/1998 | Broedner et al. |
| 5,819,220 A | 10/1998 | Sarukkai et al. |
| 5,819,306 A | 10/1998 | Goldman et al. |
| 5,822,727 A | 10/1998 | Garberg et al. |
| 5,823,879 A | 10/1998 | Goldberg et al. |
| 5,832,063 A | 11/1998 | Vysotsky et al. |
| 5,832,440 A | 11/1998 | Woodbridge et al. |
| 5,835,570 A | 11/1998 | Wattenbarger |
| 5,838,682 A | 11/1998 | Dekelbaum et al. |
| 5,867,494 A | 2/1999 | Krishnaswamy et al. |
| 5,867,495 A | 2/1999 | Elliott et al. |
| 5,870,550 A | 2/1999 | Wesinger, Jr. et al. |
| 5,873,080 A | 2/1999 | Coden et al. |
| 5,881,134 A | 3/1999 | Foster et al. |
| 5,881,135 A | 3/1999 | Watts et al. |
| 5,884,032 A | 3/1999 | Bateman et al. |
| 5,884,262 A | 3/1999 | Wise et al. |
| 5,884,266 A | 3/1999 | Dvorak |
| 5,890,123 A | 3/1999 | Brown et al. |
| 5,914,951 A | 6/1999 | Bentley et al. |
| 5,915,001 A | 6/1999 | Uppaluru |
| 5,917,817 A | 6/1999 | Dunn et al. |
| 5,940,598 A | 8/1999 | Strauss et al. |
| 5,943,399 A | 8/1999 | Bannister et al. |
| 5,946,389 A | 8/1999 | Dold |
| 5,953,392 A | 9/1999 | Rhie et al. |
| 5,974,124 A | 10/1999 | Schlueter et al. |
| 5,974,413 A | 10/1999 | Beauregard et al. |
| 5,991,292 A | 11/1999 | Focsaneanu et al. |
| 5,995,615 A | 11/1999 | Miloslavsky |
| 5,999,525 A | 12/1999 | Krishnaswamy et al. |
| 5,999,611 A | 12/1999 | Tatchell et al. |
| 5,999,965 A | 12/1999 | Kelly |
| 6,012,088 A | 1/2000 | Li et al. |
| 6,014,437 A | 1/2000 | Acker et al. |
| 6,014,626 A | 1/2000 | Cohen |
| 6,018,710 A | 1/2000 | Wynblatt et al. |
| 6,021,181 A | 2/2000 | Miner et al. |
| 6,021,190 A | 2/2000 | Fuller et al. |
| 6,031,904 A | 2/2000 | An et al. |
| 6,038,305 A | 3/2000 | McAllister et al. |
| 6,044,107 A | 3/2000 | Gatherer et al. |
| 6,047,053 A | 4/2000 | Miner et al. |
| 6,052,372 A | 4/2000 | Gittins et al. |
| 6,067,516 A | 5/2000 | Levay et al. |
| 6,078,580 A | 6/2000 | Mandalia et al. |
| 6,081,518 A | 6/2000 | Bowman-Amuah |
| 6,081,782 A | 6/2000 | Rabin |
| 6,091,808 A | 7/2000 | Wood et al. |
| 6,101,472 A | 8/2000 | Giangarra et al. |
| 6,104,803 A | 8/2000 | Weser et al. |
| 6,115,737 A | 9/2000 | Ely et al. |
| 6,115,742 A | 9/2000 | Franklin et al. |
| 6,130,933 A | 10/2000 | Miloslavsky |
| 6,131,095 A | 10/2000 | Low et al. |
| 6,137,863 A | 10/2000 | Brown et al. |
| 6,157,705 A | 12/2000 | Perrone |
| 6,161,128 A | 12/2000 | Smyk |
| 6,178,399 B1 | 1/2001 | Takebayashi et al. |
| 6,185,535 B1 | 2/2001 | Hedin et al. |
| 6,188,683 B1 | 2/2001 | Lang et al. |
| 6,195,357 B1 | 2/2001 | Polcyn |
| 6,199,076 B1 | 3/2001 | Logan et al. |
| 6,201,814 B1 | 3/2001 | Greenspan |
| 6,201,863 B1 | 3/2001 | Miloslavsky |
| 6,208,638 B1 | 3/2001 | Rieley et al. |
| 6,215,858 B1 | 4/2001 | Bartholomew et al. |
| 6,230,132 B1 | 5/2001 | Class et al. |
| 6,233,318 B1 | 5/2001 | Picard et al. |
| 6,243,373 B1 | 6/2001 | Turock |
| 6,252,944 B1 | 6/2001 | Hansen, II et al. |
| 6,269,336 B1 | 7/2001 | Ladd et al. |
| 6,285,745 B1 | 9/2001 | Bartholomew et al. |
| 6,327,572 B1 | 12/2001 | Morton et al. |
| 6,330,538 B1 | 12/2001 | Breen |
| 6,349,132 B1 | 2/2002 | Wesemann et al. |
| 6,353,661 B1 | 3/2002 | Bailey, III |
| 6,366,575 B1 | 4/2002 | Barkan et al. |
| 6,366,578 B1 | 4/2002 | Johnson |
| 6,424,945 B1 | 7/2002 | Sorsa |
| 6,430,282 B1 | 8/2002 | Bannister et al. |
| 6,434,529 B1 | 8/2002 | Walker et al. |
| 6,445,694 B1 | 9/2002 | Swartz |
| 6,446,076 B1 | 9/2002 | Burkey et al. |
| 6,456,699 B1 | 9/2002 | Burg et al. |
| 6,459,910 B1 | 10/2002 | Houston |
| 6,477,240 B1 | 11/2002 | Lim et al. |
| 6,477,420 B1 | 11/2002 | Struble et al. |
| 6,490,627 B1 | 12/2002 | Kalra et al. |
| 6,501,966 B1 | 12/2002 | Bareis et al. |
| 6,505,163 B1 | 1/2003 | Zhang et al. |
| 6,529,948 B1 | 3/2003 | Bowman-Amuah |
| 6,532,444 B1 | 3/2003 | Weber |
| 6,539,359 B1 | 3/2003 | Ladd et al. |
| 6,546,393 B1 | 4/2003 | Khan |
| 6,560,604 B1 | 5/2003 | Fascenda |
| 6,584,439 B1 | 6/2003 | Geilhufe et al. |
| 6,593,944 B1 | 7/2003 | Nicolas et al. |
| 6,594,348 B1 | 7/2003 | Bjurstrom et al. |
| 6,594,692 B1 | 7/2003 | Reisman |
| 6,618,039 B1 | 9/2003 | Grant et al. |
| 6,618,726 B1 | 9/2003 | Colbath et al. |
| 6,618,763 B1 | 9/2003 | Steinberg |
| 6,633,846 B1 * | 10/2003 | Bennett ............... G06F 17/3043 704/257 |
| 6,636,831 B1 | 10/2003 | Profit, Jr. et al. |
| 6,654,814 B1 | 11/2003 | Britton et al. |
| 6,665,640 B1 * | 12/2003 | Bennett ............... G06F 17/3043 704/257 |
| 6,687,341 B1 | 2/2004 | Koch et al. |
| 6,704,024 B2 | 3/2004 | Robotham et al. |
| 6,718,015 B1 | 4/2004 | Berstis |
| 6,721,705 B2 | 4/2004 | Kurganov et al. |
| 6,732,142 B1 | 5/2004 | Bates et al. |
| 6,763,388 B1 | 7/2004 | Tsimelzon |

(56) References Cited

U.S. PATENT DOCUMENTS

| | | | |
|---|---|---|---|
| 6,771,732 B2 | 8/2004 | Xiao et al. | |
| 6,775,264 B1 | 8/2004 | Kurganov | |
| 6,785,266 B2 | 8/2004 | Swartz | |
| 6,807,257 B1 | 10/2004 | Kurganov | |
| 6,812,939 B1 | 11/2004 | Flores et al. | |
| 6,823,370 B1 | 11/2004 | Kredo et al. | |
| 6,888,929 B1 | 5/2005 | Saylor et al. | |
| 6,922,733 B1 | 7/2005 | Kuiken et al. | |
| 6,941,273 B1 | 9/2005 | Loghmani et al. | |
| 6,964,012 B1 | 11/2005 | Zirngibl et al. | |
| 6,964,023 B2 | 11/2005 | Maes et al. | |
| 6,965,864 B1 | 11/2005 | Thrift et al. | |
| 6,996,609 B2 | 2/2006 | Hickman et al. | |
| 6,999,804 B2 | 2/2006 | Engstrom et al. | |
| 7,003,463 B1 | 2/2006 | Maes et al. | |
| 7,024,464 B1 | 4/2006 | Lusher et al. | |
| 7,050,977 B1 * | 5/2006 | Bennett | G06F 17/2775 704/270.1 |
| 7,075,555 B1 | 7/2006 | Flores et al. | |
| 7,076,431 B2 | 7/2006 | Kurganov et al. | |
| 7,089,307 B2 | 8/2006 | Zintel et al. | |
| 7,145,898 B1 | 12/2006 | Elliott | |
| 7,327,723 B2 * | 2/2008 | Kurganov | 370/352 |
| 7,386,455 B2 * | 6/2008 | Kurganov et al. | 704/270.1 |
| 7,516,190 B2 * | 4/2009 | Kurganov | 709/217 |
| 7,881,941 B2 * | 2/2011 | Kurganov et al. | 704/275 |
| 8,098,600 B2 * | 1/2012 | Kurganov | 370/260 |
| 8,185,402 B2 * | 5/2012 | Kurganov et al. | 704/275 |
| 2001/0032234 A1 | 10/2001 | Summers et al. | |
| 2001/0040885 A1 | 11/2001 | Jonas et al. | |
| 2001/0048676 A1 | 12/2001 | Jimenez et al. | |
| 2002/0006126 A1 | 1/2002 | Johnson et al. | |
| 2002/0059402 A1 | 5/2002 | Belanger | |
| 2002/0064149 A1 | 5/2002 | Elliott et al. | |
| 2002/0090114 A1 | 7/2002 | Rhoads et al. | |
| 2004/0160913 A1 | 8/2004 | Kubler et al. | |
| 2005/0025133 A1 | 2/2005 | Swartz | |
| 2005/0030179 A1 | 2/2005 | Script et al. | |
| 2005/0074104 A1 | 4/2005 | Swartz | |

FOREIGN PATENT DOCUMENTS

| | | |
|---|---|---|
| EP | 0794650 A2 | 9/1997 |
| GB | 2 211 698 | 7/1989 |
| GB | 2 240 693 | 8/1991 |
| GB | 2317782 | 4/1998 |
| JP | 1-258526 | 10/1989 |
| WO | WO 91/07838 | 5/1991 |
| WO | WO 91/18466 | 11/1991 |
| WO | WO 96/09710 | 3/1996 |
| WO | 9734401 | 9/1997 |
| WO | WO 97/37481 | 9/1997 |
| WO | 97/37481 | 10/1997 |
| WO | WO 98/23058 | 5/1998 |
| WO | 9823058 | 9/1998 |

OTHER PUBLICATIONS

Amended Complaint, *Parus Holdings, Inc.* v. *Web Telephony LLC & Robert Swartz*, Case No. 06-cv-01146 (N.D. Ill.),, Jul. 10, 2006, 14 pages.

AT&T, Press Release, "AT&T Customers Can Teach Systems to Listen and Respond to Voice", Jan. 17, 1995, pp. 1-2, Basking Ridge, NJ, available at www.lucent.com/press/0195/950117.gbb.html (accessed Mar. 15, 2005).

Bellcore Technology Licensing, "The Electronic Receptionist—A Knowledge-Based Approach to Personal Communications", 1994, pp. 1-8.

Brachman et al., "Fragmentation in Store-and-Forward Message Transfer", IEEE Communications Magazine, vol. 26(7), Jul. 1998, pp. 18-27.

"Business Phone Systems for Advanced Offices", NTT Review, vol. 2 (6), Nov. 1990, pp. 52-54.

Cole et al., "An Architecture for a Mobile OSI Mail Access System", IEEE Journal on Selected Areas in Communications, vol. 7 (2), Feb. 1989, pp. 249-256.

"Data Communications Networks: Message Handling Systems", Fasciele, VIII. 7-Recommendations X.400-X.430, 42 pages, date unknown.

DAX Systems, Inc., Press Release, "Speech Recognition Success in DAX's Grasp", Nov. 22, 1995, pp. 1-2, Pine Brook, NJ.

Defendants Answer to the Amended Complaint and Demand for Jury Trial, *Parus Holdings, Inc.* v. *Web Telephone LLC & Robert Swartz*, Case No. 06-cv-01146 (N.D. Ill.), Aug. 10, 2006, 14 pages.

"Faxpak Store and Forward Facsimile Transmission Service", Electrical Communication, vol. 54 (3), 1979, pp. 251-255.

Garcia et al., "Issue in Multimedia Computer-Based Message Systems Design and Standardization", NATO ASI Series, vol. 1-6, 1984, 10 pgs.

"GLOBECOM '85 IEEE Global Telecommunications Conference, "New Orleans, LA., Dec. 2-5, 1985, pp. 1295-1300.

Hemphill et al. "Speech-Aware Multimedia," IEEE Multimedia, Spring 1996, vol. 3, No. 1. pp. 74-78, IEEE.

Hunt et al., "Long-Distance Remote Control to the Rescue", Chicago Tribune, Jun. 15, 2002, Section 4, p. 15.

"Introducing PIC SuperFax, First PC/Fax System to Run Under Windows", Pacific Image Communications, Pasadena, CA, Date Unknown, (received at COMDEX show, Nov. 3, 1987). 3 pgs.

"Juggler by Pure Speech," p. 1, available at http://members.aol.com/compqanda/juggler.html (accessed on Dec. 8. 2006).

Kubala et al., BYBLOS Speech Recognition Benchmark Results:, Workshop on Speech & Natural Language, Feb. 19-22, 1991.

Ly, "Chatter: A Conversational Telephone Agent", submitted to Program in Media Arts, & Sciences, MIT, 1993, pp. 1-130.

Maeda, et al., "An Intelligent Customer-Controlled Switching System", IEEE Global Telecommunications Conference, Hollywood, Florida, Nov. 28-Dec. 1, 1988, pp. 1499-1503.

Markowitz, J., "The Ultimate Computer Input Device May Be Right Under Your Nose", Byte, Dec. 1995, pp. 1-13, available at www.byte.com/art/9512/sec8/art1.htm (accessed Mar. 15, 2005).

Marx et al., "Mail Call: Message Presentation and Navigation in a Nonvisual Environment," SIGCHI Conference on Human Factors in Computing Systems, Vancouver, B.C. Canada, Apr. 13-18, 1996.

Marx, M., "Toward Effective Conversational Messaging" (Thesis). As indicated on the cover page, the thesis was presented to the Department Committee on Graduate Students, Program in Media Arts and Sciences, School of Architecture and Planning, Massachusetts Institute of Technology on May 12, 1995.

Oye, Phil, "Juggler", p. 1, available at http://www.philoye.com/work/juggler/index.shtml (accessed on Dec. 8, 2006).

Oye, Phil, "Juggler", p. 1, available at http://www.philoye.com/work/juggler_2.shtml (accessed on Dec. 8, 2006).

Oye, Phil, "Juggler", p. 1, available at http://www.philoye.com/work/juggler_3.shtml (accessed on Dec. 8, 2006).

Perdue et al., "Conversant® 1 Voice System: Architecture and Applications", Jul. 17, 1986, AT&T Technical Journal, pp. 1-14.

Plaintiff Parus Holdings, Inc.'s Supplemental Response to Defendant Web Telephony LLC's First Set of Interrogatories (Nos. 1-12), *Parus Holdings, Inc.* v. *Web Telephony LLC & Robert Swartz*, Case No. 06-cv-01146 (N.D. Ill.), Oct. 31, 2006, 32 pages.

Plaintiff Parus Holdings, Inc.'s Supplemental Response to Defendant Web Telephony LLC's Second Set of Interrogatories (Nos. 13-17), *Parus Holdings, Inc.* v. *Web Telephony LLC & Robert Swartz*, Case No. 06-cv-01146 (N.D. Ill.), Oct. 31, 2006, 31 pages.

Print outs of Internet web site, "Wildfire Communications, Inv.,", Nov. 5, 1997, including print outs of the following web pages: http://www.wildfire.com; http://www.wildfire.com/consumerhome.html; http://www.wildfire.com/106.html; http://www.wildfire.com/carrierhome.html; http://www.wildfire.com/sfandb.html; http://www.wildfire.com/about.html; http://www.wildfire.com/abtmgmt.html; http://www.wildfire.com/scoop.html; http://www.wildfire.com/intel.html; and http://www.wildfire.com/msft.html.

"Proceedings of the IFIP World Computer Congress", Dublin, Ireland, Sep. 1-5, 1986.

(56) References Cited

OTHER PUBLICATIONS

"PureSpeech Announces Juggler PC System for First Quarter of 1997", HighBeam Research, Sep. 19, 1996, pp. 1-3, available at http://www.highbeam.com/doc/1G1-186909545.html (accessed on Dec. 8, 2006).
PureSpeech, "Meet the Voice of Juggler!", the date of Nov. 18, 1996 is shown on the top of p. 1.
Ross, Randy, "Retrieve E-Mail from a Telephone", Oct. 7, 1996, pp. 1-2, available at http://resna.org/ProfessOrg?Sigs?SIGSites/sig11/archive/juggler.htm (accessed on Dec. 8, 2006). Printout indicates that the article was originally printed in PC World.
Sartori, M., "Speech Recognition", Apr. 1995, pp. 1-9, Mercury Communications, available at www.gar.co.uk/technology_watch/speech.htm (accessed Mar. 15, 2005).
Schmandt et al., "A Conversational Telephone Messaging Systems", IEEE Transactions on Consumer Electronics, 1984, vol. CE-30, No. 3, pp. xxi-xxiv.
Schmandt, et al., "Phone Shell: The Telephone as Computer Terminal", ACM Multimedia, 1993, 11 pages.
Schmandt, et al., "Phone Slave: A Graphical Telecommunications Interface", Proceedings of the SID, 1985, vol. 26/1, pp. 79-82.
"Secretarial Branch Exchange", IBM Technical Disclosure Bulletin, vol. 26 (5), Oct. 1983, pp. 2645-2647.
Shimamura, et al., "Review of the Electrical Communication Laboratories", vol. 418, (33), No. 1, Tokyo, Japan, 1985, pp. 31-39.
"The VMX Systems Product Reference Manual: Product Description Volume", May 1994, vol. 1, release 7.1, VMX, Inc. (Octel Communications Corp.) San Jose, CA, USA.
"VMXworks Product Reference Manual: vol. 3 Programmer's Guide", Jul. 1994, vols. 3 & 4, Release 3.1, Octel Communications Corp.) Milpitas, CA, USA.
"Wildfire Communication, Inc.", Harvard Business School, Mar. 21, 1996, Publ. No. 9-396-305, pp. 1-22.
"WordPerfect: New Telephony Features Boost Office", WordPerfect Office TechBrief, 1994, Info-World Publishing Co., vol. 10, Issue 2, pp. 2-3.
Yang, E., "INETPhone—Telephone Services and Servers on the Internet", Apr. 1995, University of North Texas, pp. 1-6.
Hemphill et al., "Surfing the Web by Voice," ACM Multimedia 95—Electronic Proceedings, Nov. 5-9, 1995. San Francisco, CA.
Ly, "Chatter A: A Conversational Telephone Agent," submitted to Program in Media Arts and Sciences, Massachusetts Institute of Technology, (1993), pp. 1-130.
Schmandt, "Phoneshell: the Telephone as Computer Terminal," Proceedings of ACM Multimedia '93 Conference (1993), pp. 373-382.
Schmandt et al., "Phone Slave: A Graphical Telecommunications Interface," Proceedings of the SID (1985), vol. 26/1, pp. 79-82.
Examples: Abstract Ideas, 2014, 20 pages.
IBM AIX DirectTalk/6000 Version 1 Release 6 Improves Your Voice Processing Services to Callers and Customers, Announcement No. 295-489, Nov. 28, 1995, 27 pages.
IBM Announcement Letter No. A95-893, retrieved on Mar. 9, 2015, 10 pages.
IBM, AIX DirectTalk/6000 Release 6: Speech Recognition with the BBN Hark Recognizer, SC33-1734-00, Feb. 1996, 250 pages.
IBM, AIX DirectTalk/6000: General Information and Planning, Release 6, GC33-1720-00, Dec. 1995, 162 pages.
IBM, DirectTalkMail: Administration, Release 6, SC33-1733-00, Feb. 1996, 274 pages.
"McGraw-Hill Dictionary of Scientific & Technical Terms 1101, 6th ed. 2003," (Referenced in Amendment and Reply Under 37 CFR 1.111 filed for U.S. Appl. No. 10/877,366 on Apr. 24, 2009) No copy is provided but please inform if a copy of this dictionary is required.
Newton, Harry, Newtons Telecom Dictionary—The Official Glossary of Telecommunications and Voice Processing Terms, Dec. 1992, 6 pages.
Paper No. 10, Denying Institution of Covered Business Method Patent Review CBM2015-00109 and CBM2015-00149, Nov. 9, 2015, 19 pages.
Paper No. 10, Denying Institution of Covered Business Method Patent Review CBM2015-00110 and CBM2015-00150, Nov. 9, 2015, 20 pages.
Paper No. 10, Denying Institution of Covered Business Method Patent Review CBM2015-00111 and CBM2015-00151, Nov. 9, 2015, 19 pages.
Paper No. 10, Denying Institution of Covered Business Method Patent Review CBM2015-00112 and CBM2015-00152, Nov. 9, 2015, 18 pages.
Putz, Steve, Interactive Information Services Using World-Wide Web Hypertext, First Int'l Conference on World-Wide Web (May 25-27, 1994), 10 pages.
Memorandum Opinion and Order, Oct. 8, 2015, 27 pages.
Update Subject Matter Eligibility, Jul. 2015, 33 pages.
Wikipedia Definition of "Internet", available at http://en.wikipedia.org/wiki/Internet Retrieved on Feb. 10, 2016, pp. 24-26.
Opening Brief of Appellant Parus Holdings, Inc., submitted on Mar. 8, 2016, to the United States Court of Appeals for the Federal Circuit, 236 pages.
Brief of Appellees, submitted on Jun. 20, 2016, to the United States Court of Appeals for the Federal Circuit, 53 pages.

* cited by examiner

ROBUST VOICE BROWSER SYSTEM AND VOICE ACTIVATED DEVICE CONTROLLER

CROSS REFERENCE TO RELATED APPLICATIONS

This application is a continuation of application Ser. No. 12/973,475, entitled "Robust Voice Browser System And Voice Activated Device Controller," filed Dec. 20, 2010, which is a continuation of application Ser. No. 12/030,556, entitled "Robust Voice Browser System And Voice Activated Device Controller," filed Feb. 13, 2008, now U.S. Pat. No. 7,881,941, which is a continuation application of application Ser. No. 11/409,703, entitled "Robust Voice Browser System And Voice Activated Device Controller," filed Apr. 24, 2006, now U.S. Pat. No. 7,386,455, which is a continuation application of application Ser. No. 10/821,690, entitled "Robust Voice Browser System And Voice Activated Device Controller," filed Apr. 9, 2004, now U.S. Pat. No. 7,076,431, which is a continuation application of application Ser. No. 09/776,996, entitled "Robust Voice Browser System And Voice Activated Device Controller," filed Feb. 5, 2001, now U.S. Pat. No. 6,721,705, which claims priority to U.S. Provisional Application Ser. No. 60/180,344, entitled "Voice Activated Information Retrieval System," filed Feb. 4, 2000 and U.S. Provisional Application No. 60/233,068, filed Sep. 15, 2000, entitled "Robust Voice Browser System and Voice Activated Device Controller, all assigned to the assignee of the present application. The subject matter in the above-identified co-pending and commonly owned applications is incorporated herein by reference.

FIELD OF THE INVENTION

The present invention relates to a robust and highly reliable system that allows users to browse web sites and retrieve information by using conversational voice commands. Additionally, the present invention allows users to control and monitor other systems and devices that are connected the Internet or any other network by using voice commands.

BACKGROUND OF THE INVENTION

Currently, three options exist for a user who wishes to gather information from a web site accessible over the Internet. The first option is to use a desktop or a laptop computer connected to a telephone line via a modem or connected to a network with Internet access. The second option is to use a Personal Digital Assistant (PDA) that has the capability of connecting to the Internet either through a modem or a wireless connection. The third option is to use one of the newly designed web-phones or web-pagers that are now being offered on the market. Although each of these options provide a user with access to the Internet to browse web sites, each of them have their own drawbacks.

Desktop computers are very large and bulky and are difficult to transport. Laptop computers solve this inconvenience, but many are still quite heavy and are inconvenient to carry. Further, laptop computers cannot be carried and used everywhere a user travels. For instance, if a user wishes to obtain information from a remote location where no electricity or communication lines are installed, it would be nearly impossible to use a laptop computer. Oftentimes, information is needed on an immediate basis where a computer is not accessible. Furthermore, the use of laptop or desktop computers to access the Internet requires either a direct or a dial-up connection tan an Internet Service Provider (ISP). Oftentimes, such connections are not available when a user desires to connect to the Internet to acquire information.

The second option for remotely accessing web sites is the use of PDAs. These devices also have their own set of drawbacks. First, PDAs with the ability to connect to the Internet and access web sites are not readily available. As a result, these PDAs tend to be very expensive. Furthermore, users are usually required to pay a special service fee to enable the web browsing feature of the PDA. A further disadvantage of these PDAS is that web sites must be specifically designed to allow these devices to access information on the web site. Therefore, a limited number of web sites are available that are accessible by these web-enabled PDAs. Finally, it is very common today for users to carry cell phones, however, users must also carry a separate PDA if they require the ability to gather information from various web sites. Users are therefore subjected to added expenses since they must pay for both cellular telephone service and also for the web-enabling service for the PDA. This results in a very expensive alternative for the consumer.

The third alternative mentioned above is the use of web-phones or web-pagers. These devices suffer many of the same drawbacks as PDAs. First, these devices are expensive to purchase. Further, the number of web sites accessible to these devices is limited since web sites must be specifically designed to allow access by these devices. Furthermore, users are often required to pay an additional fee in order to gain wireless web access. Again, this service is expensive. Another drawback of these web-phones or web-pagers is that as technology develops, the methods used by the various web sites to allow access by these devices may change. These changes may require users to purchase new web-phones or web-pagers or have the current device serviced in order to upgrade the firmware or operating system stored within the device. At the least, this would be inconvenient to users and may actually be quite expensive.

Therefore, a need exists for a system that allows users to easily access and browse the Internet from any location. Such a system would only require users to have access to any type of telephone and would not require users to subscribe to multiple services.

In the rapidly changing area of Internet applications, web sites change frequently. The design of the web site may change, the information required by the web site in order to perform searches may change, and the method of reporting search results may change. Web browsing applications that submit search requests and interpret responses from these web sites based upon expected formats will produce errors and useless responses when such changes occur. Therefore, a need exists for a system that can detect modifications to web sites and adapt to such changes in order to quickly and accurately provide the information requested by a user through a voice enabled device, such as a telephone.

When users access web sites using devices such as personal computers, delays in receiving responses are tolerated and are even expected, however, such delays are not expected when a user communicates with a telephone. Users expect communications over a telephone to occur immediately with a minimal amount of delay time. A user attempting to find information using a telephone expects immediate responses to his search requests. A system that introduces too much delay between the time a user makes a request and the time of response will not be tolerated by users and will lose its usefulness. Therefore, it is important that a voice browsing system that uses telephonic communications selects web sites that provide rapid responses since speed is an important factor for maintaining the system's desirability and usability. Therefore, a need exists for a system that accesses web sites based upon their speed of operation.

SUMMARY OF THE INVENTION

It is an object of an embodiment of the present invention to allow users to gather information from web sites by using voice enabled devices, such as wireline or wireless telephones.

An additional object of an embodiment of the present invention is to provide a system and method that allows the searching and retrieving of publicly available information by controlling a web browsing server using naturally spoken voice commands.

It is an object of another embodiment of the present invention to provide a robust voice browsing system that can obtain the same information from several web sites based upon a ranking order. The ranking order is automatically adjusted if the system detects that a given web site is not functioning, is too slow, or has been modified in such a way that the requested information cannot be retrieved any longer.

A still further object of an embodiment of the present invention is to allow users to gather information from web sites from any location where a telephonic connection can be made.

Another object of an embodiment of the present invention is to allows users to browse web sites on the Internet using conversational voice commands spoken into wireless or wireline telephones or other voice enabled devices.

An additional object an embodiment of the present invention is to provide a system and method for using voice commands to control and monitor devices connected to a network.

It is an object of an embodiment of the present invention to provide a system and method which allows devices connected to a network to be controlled by conversational voice commands spoken into any voice enabled device interconnected with the same network.

The present invention relates to a system for acquiring information from sources on a network, such as the Internet. A voice browsing system maintains a database containing a list of information sources, such as web sites, connected to a network. Each of the information sources is assigned a rank number which is listed in the database along with the record for the information source. In response to a speech command received from a user, a network interface system accesses the information source with the highest rank number in order to retrieve information requested by the user.

The a preferred embodiment of the present invention allows users to access and browse web sites when they do not have access to computers with Internet access. This is accomplished by providing a voice browsing system and method that allows users to browse web sites using conversational voice commands spoken into any type of voice enabled device (i.e., any type of wireline or wireless telephone, LP phone, wireless PDA, or other wireless device). These spoken commands are then converted into data messages by a speech recognition software engine running on a user interface system. These data messages are then sent to and processed by a network interface system. This network interface system then generates the proper requests that are transmitted to the desired web site over the Internet. Responses sent from the web site are received and processed by the network interface system and then converted into an audio message via a speech synthesis engine or a prerecorded audio concatenation application and finally transmitted to the user's voice enabled device.

A preferred embodiment of the voice browser system and method uses a web site polling and ranking methodology that allows the system to detect changes in web sites and adapt to those changes in real-time. This enables the voice browser system of a preferred embodiment to deliver highly reliable information to users over any voice enabled device. This ranking system also enables the present invention to provide rapid responses to user requests. Long delays before receiving responses to requests are not tolerated by users of voice-based systems, such as telephones. When a user speaks into a telephone, an almost immediate response is expected. This expectation does not exist for non-voice communications, such as email transmissions or accessing a web site using a personal computer. In such situations, a reasonable amount of transmission delay is acceptable. The ranking system of implemented by a preferred embodiment of the present invention ensures users will always receive the fastest possible response to their request.

An alternative embodiment of the present invention allows users to control and monitor the operation of a variety of household devices connected to a network using speech commands spoken into a voice enabled device.

DETAILED DESCRIPTION OF THE INVENTION

A first embodiment of the present invention is a system and method for allowing users to browse information sources, such as web sites, by using naturally spoken, conversational voice commands spoken into a voice enabled device. Users are not required to learn a special language or command set in order to communicate with the voice browsing system of the present invention. Common and ordinary commands and phrases are all that is required for a user to operate the voice browsing system. The voice browsing system recognizes naturally spoken voice commands and is speaker-independent; it does not have to be trained to recognize the voice patterns of each individual user. Such speech recognition systems use phonemes to recognize spoken words and not predefined voice patterns.

The first embodiment allows users to select from various categories of information and to search those categories for desired data by using conversational voice commands. The voice browsing system of the first preferred embodiment includes a user interface system referred to as a media server. The media server contains a speech recognition software engine. This speech recognition engine is used to recognize natural, conversational voice commands spoken by the user and converts them into data messages based on the available recognition grammar. These data messages are then sent to a network interface system. In the first preferred embodiment, the network interface system is referred to as a web browsing server. The web browsing server then accesses the appropriate information source, such as a web site, to gather information requested by the user.

Responses received from the information sources are then transferred to the media server where speech synthesis engine converts the responses into audio messages that are transmitted to the user. A more detailed description of this embodiment will now be provided.

Figure 1:
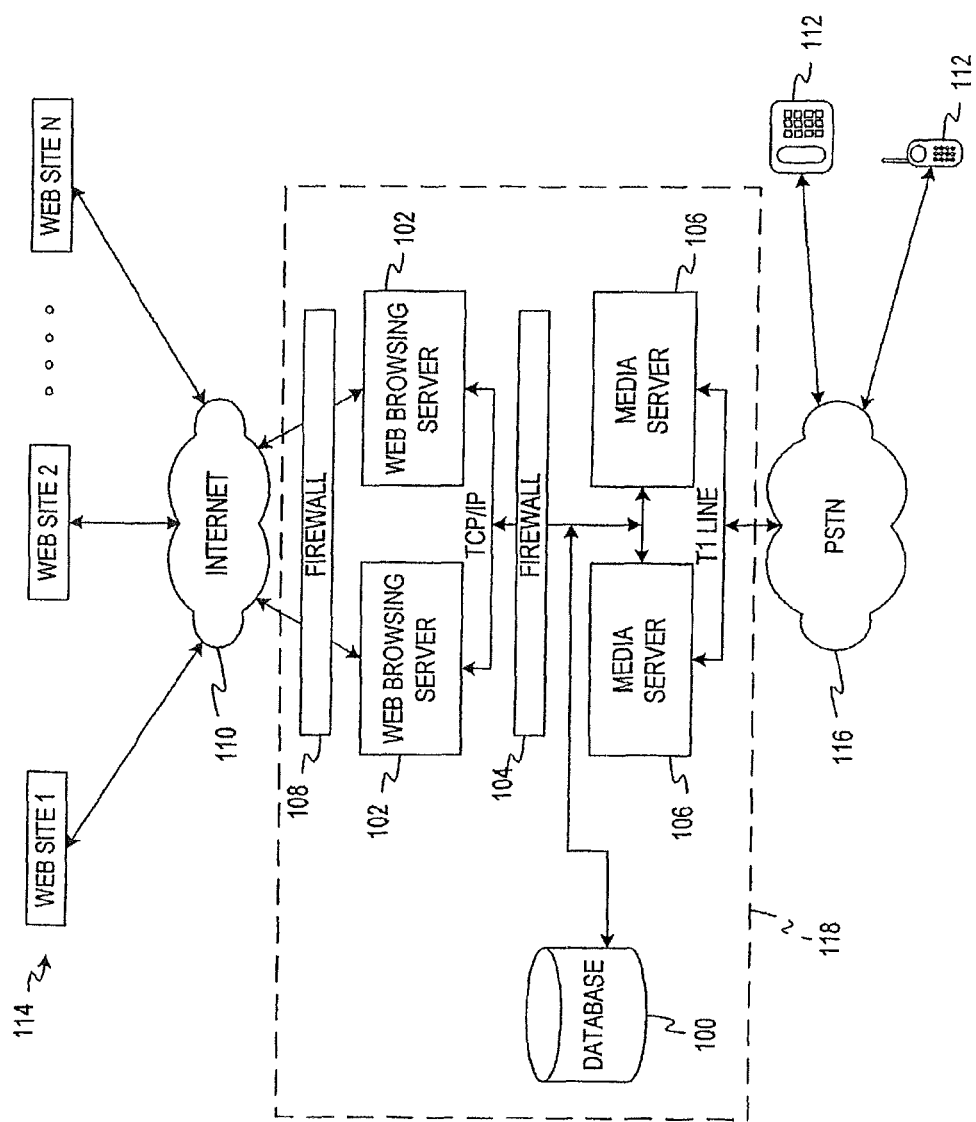
FIG. 1 is a depiction of the voice browsing system of the first embodiment of the present invention.
Figure 2:
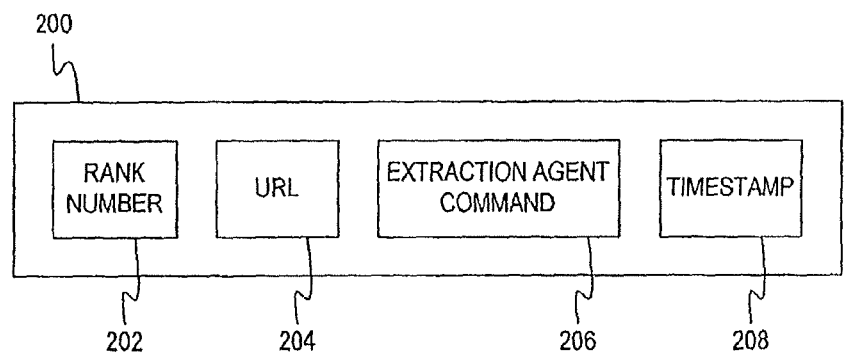
FIG. 2 is a block diagram of a database record used by the first preferred embodiment of the present invention.

Referring to FIG. 1, a database 100 designed by Webley Systems Incorporated is connected to one or more web browsing servers 102 as well as to one or more media servers 106. The database may store information on magnetic media, such as a hard disk drive, or it may store information via other widely acceptable methods for storing data, such as optical disks. The database 100 contains a separate set of records for each web site accessible by the system. An example of a web site record is shown in FIG. 2. Each web site record 200 contains the rank number of the web site 202, the associated Uniform Resource Locator (URL) 204, and a command that enables the appropriate "extraction agent" 206 that is required in order to generate proper requests sent to and to format data received from the web site. The database record 200 also contains the timestamp 208 indicating the last time the web site was accessed. The extraction agent is described in more detail below. The database 100 categorizes each database record 200 according to the type of information provided by each web site. For instance, a first category of database records 200 may correspond to web sites that provide "weather" information. The database 100 may also contain a second category of records 200 for web sites that provide "stock" information. These categories may be further divided into subcategories. For instance, the "weather" category may contain subcategories depending upon type of weather information available to a user, such as "current weather" or "extended forecast". Within the "extended forecast" subcategory, a list of web site records may be stored that provide weather information for multiple days. The use of subcategories may allow the web browsing feature to provide more accurate, relevant, and up-to-date information to the user by accessing the most relevant web site. The number of records contained in each category or subcategory is not limited. In the preferred embodiment, three web site records are provided for each category.

Table 1 below depicts two database records 200 that are used with the preferred embodiment. These records also contain a field indicating the "category" of the record, which is "weather" in each of these examples.

TABLE 1 category: weather
URL:URL=http: //cgi .cnn.com/cgi-
bin/weather/redirect?zip=_zip
rank: 1
command:   web_dispatch .pl weather_cnn
browsingserver: wportal1
browsingServerBackup: wportal2
dateTime:   Dec 21 2000   2:15PM
category: weather
URL: URL= http: //weather.lycos.com/wcfiveday.asp?city=zip
rank:     2
command:   web_dispatch.pl weather_lycos
browsingServer: wportal1
browsingserverBackup:   wportal2
dateTime:   Dec 21 2000 1:45PM The database also contains a listing of pre-recorded audio files used to create concatenated phrases and sentences. Further, database 100 may contain customer profile information, system activity reports, and any other data or software servers necessary for the testing or administration of the voice browsing system.

Figure 3:
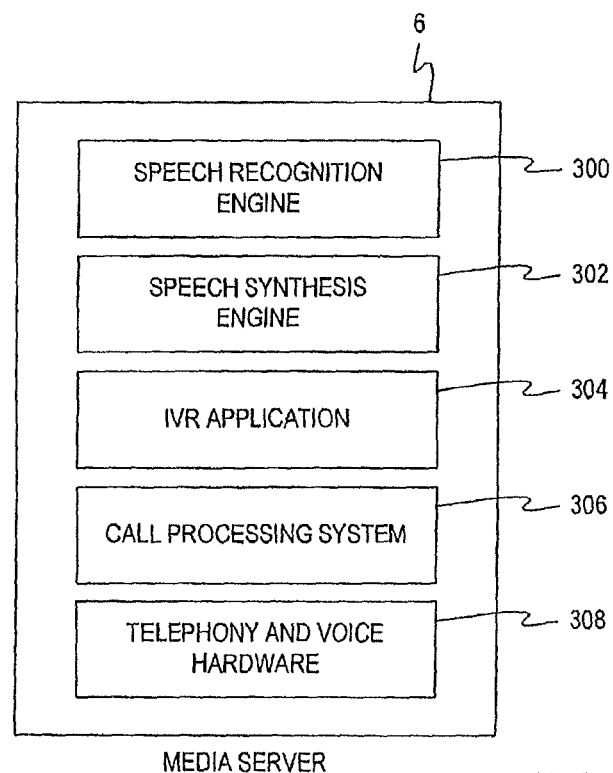
FIG. 3 is a block diagram of a media server used by the preferred embodiment.

The operation of the media servers 106 will now be discussed in relation to FIG. 3. The media servers 106 function as user interface systems. In the preferred embodiment, the media servers 106 contain a speech recognition engine 300, a speech synthesis engine 302, an Interactive Voice Response (IVR) application 304, a call processing system 306, and telephony and voice hardware 308 required to communicate with the Public Switched Telephone Network (PSTN) 116. In the preferred embodiment, each media server is based upon Intel's Dual Pentium III 730 MHz microprocessor system.

The speech recognition function is performed by a speech recognition engine 300 that converts voice commands received from the user's voice enabled device 112 (i.e., any type of wireline or wireless telephone, Internet Protocol (IP) phones, or other special wireless units) into data messages. In the preferred embodiment, voice commands and audio messages are transmitted using the PSTN 116 and data is transmitted using the TCP/IP communications protocol. However, one skilled in the art would recognize that other transmission protocols may be used for either voice or data. Other possible transmission protocols would include SIP/VoIP (Session Initiation Protocol/Voice over IP), Asynchronous Transfer Mode (ATM) and Frame Relay. A preferred speech recognition engine is developed by Nuance Communications of 1380 Willow Road, Menlo Park, Calif. 94025 (www.nuance.com). The Nuance engine capacity is measured in recognition units based on CPU type as defined in the vendor specification. The natural speech recognition grammars (i.e., what a user can say that will be recognized by the speech recognition engine) were developed by Webley Systems.

Table 2 below provides a partial source code listing of the recognition grammars used by the speech recognition engine of the preferred embodiment for obtaining weather information.

TABLE 2

?WHAT_IS ?the weather?[info information report conditions]
    ? ( (?like in )
    ]
UScities:n
        {<param1 $n.zip> <param2   $n.city> <param3
        $n.state>}
        ( (area code) AREA_CODE:n ) {<param1 $n>}
        ( AREA_CODE:n (area code) ) {<param1 $n>}
        ( (ZIP_CODE:n (zip ?code) ) {<param1 $n>}
    ]
    )
        ) {<menu 194>}

The media server 106 uses recognition results generated by the speech recognition engine 300 to retrieve a web site record 200 stored in the database 100 that can provide the information requested by the user. The media server 106 processes the recognition result data identifying keywords that are used to search the web site records 200 contained in the database 100. For instance, if the user's request was "What is the weather in Chicago?", the keywords "weather" and "Chicago" would be recognized. A web site record 200 with the highest rank number from the "weather" category within the database 100 would then be selected and transmitted to the web browsing server 102 along with an identifier indicating that Chicago weather is being requested.

The media servers 106 also contain a speech synthesis engine 302 that converts the data retrieved by the web browsing servers 102 into audio messages that are transmitted to the user's voice enabled device 112. A preferred speech synthesis engine is developed by Lernout and Hauspie Speech Products, 52 Third Avenue, Burlington, Mass. 01803 (www.lhsl.com).

Figure 4:
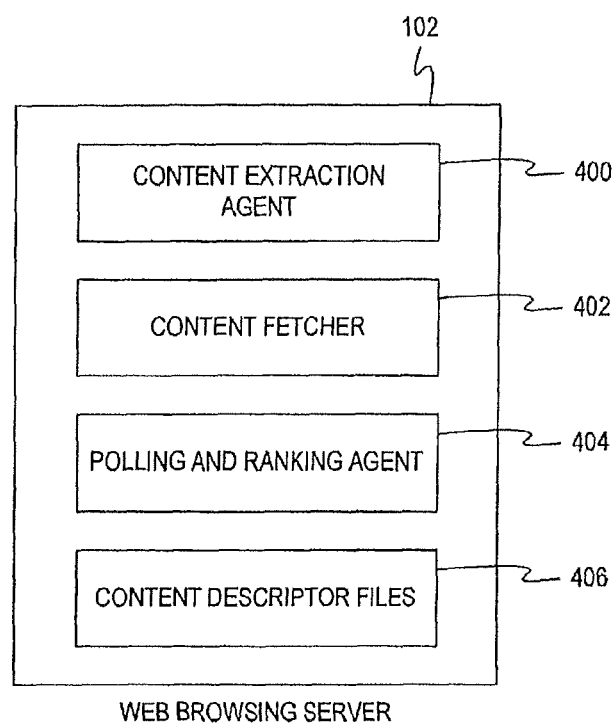
FIG. 4 is a block diagram of a web browsing server used by the preferred embodiment.

A further description of the web browsing server 102 will be provided in relation to FIG. 4. The web browsing servers 102 provide access to any computer network such as the Internet 110. These servers are also capable of accessing databases stored on Local Area Networks (LANs) or Wide Area Networks (WANs). The web browsing servers receive responses from web sites and extract the data requested by the user. This task is also known as "content extraction." The web browsing servers 102 also perform the task of periodically polling or "pinging" various web sites and modifying the ranking numbers of these web sites depending upon their response and speed. This polling feature is further discussed below. The web browsing server 102 is comprised of a content extraction agent 400, a content fetcher 402, a polling and ranking agent 404, and the content descriptor files 406. Each of these are software applications and will be discussed below.

Upon receiving a web site record 200 from the database 100 in response to a user request, the web browsing server 102 invokes the "content extraction agent" command 206 contained in the record 200. The content extraction agent 400 allows the web browsing server 102 to properly format requests and read responses provided by the web site 114 identified in the URL field 204 of the web site record 200. Each content extraction agent command 206 invokes the content extraction agent and identifies a content description file associated with the web page identified by the URL 204. This content description the directs the extraction agent where to extract data from the accessed web page and how to format a response to the user utilizing that data. For example, the content description for a web page providing weather information would indicate where to insert the "city" name or ZIP code in order to retrieve Chicago weather information. Additionally, the content description file for each supported URL indicates the location on the web page where the response information is provided. The extraction agent 400 uses this information to properly extract from the web page the information requested by the user.

Table 3 below contains source code for a content extraction agent 400 used by the preferred embodiment.

TABLE 3

```
#!/usr/local/www/bin/sybperl5
#$Header:
/usr/local/cvsroot/webley/agents/service/web_dispatch.pl,v
1.6
# Dispatches all web requests
#http://wcorp.itn.net/cgi/flstat?carrier=ua&flight_no=155&mo
n_abbr=jul&date=
6&stamp=OhLN~PdbuuE*itn/ord,itn/cb/sprint_hd
#http://cgi.cnnfn.com/flightview/r1m?airline=amt&number=300
require "config_tmp.pl";
#check parameters
die "Usage: $0 service [params]\n" if $#ARGV < 1;
#print STDERR @ARGV;
#get parameters
my %Services = (
    weather_cnn => 'webget.pl weather_cnn',
    weather_lycos => 'webget.pl
```

TABLE 3-continued

```
weather_lycos',
    weather_weather => 'webget.pl
weather_weather',
    weather_snap => 'webget.pl
weather_snap',
    weather_infospace => 'webget.pl
weather_infospace',
    stockQuote_yahoo => 'webget.pl stock',
    flightStatus_itn => 'webget.pl
flight_delay',
    yellowPages_yahoo => 'yp_data.p1',
    yellowPages_yahoo => 'yp_data.p1',
    newsHeaders_newreal => 'news.p1',
    newsArticle_newsreal => 'news.p1',
    );
# test param
my $date = 'date';
chop ( $date );
my ( $short_date ) = $date =~ / \s+ (\w{3}\s+\d{1,2}\s+/;
my %Test = (
    weather_cnn => '60053',
    weather_lycos => '60053',
    weather_weather => '60053',
    weather_snap => '60053',
    weather_infospace => '60053',
    stockQuote_yahoo => 'msft',
    flightStatus_itn => 'ua 155'.
$short_date,
    yellowPages_yahoo => 'tires 60015',
    newsHeaders_newsreal => '1',
    newsArticle_newsreal => '1 1',
    );
die "$date: $0: error: no such service: $service (check this
script)\n"
    unless $Services {$service };
# prepare absolute path to run other scripts
my ( $path, $script ) = $0 =~ m|^ */) ([^/]*)|
# store the service to compare against datatable
my $service_stored = $service;
# run service
While ( !( $response = '$path$Services [$service ]@param') )
{
    # response failed
    # check with test parameters
    $response = '$path$ Services {service }$Test{$service
}";
    if (    $response ) {
        $service = &switch_service ( $service );
#       print "Wrong parameter values were supplied:
$service -
@param\n";
#       die "$date: $0: error: wrong parameters: $service
-
@param\n";
    }
    else    {
        #change priority and notify
        $service = &increase_attempt ( $service ) ;
    }
}
# output the response
print $response;
sub increase_attempt {
    my ( $service ) = @_;
    my ( $service_name ) + split ( /_/, $service );
    print STDERR "$date: $0: attn.: changing priority for
service:
$service\n";
    # update priority
    &db_query( "update mcServiceRoute"
        / "set priority = ( select max ( priority )
from
mcServiceRoute "
        ."where service = '$service_name') + 1
"
        . "date = getdate( ), "
        . "attempt = attempt + 1 "
        . "where route = '$script $service'");
    # print "---$route===\n";
    # find new route
```

TABLE 3-continued

```
  my $route = @{&db_query ( "select route from
mcServiceRoute "
        . "where service =
'$service_name'"
          . "and attempt < 5
"
          . "order by
priority ")
       }->[0]{route };
  &db_query ( "update mcServiceRoute "
       . "set attempt =) "
       . "where route = '$script $service'")
       if ( $route eq "$script $service_stored") ;
          or $route eq "$script $service_stored") ;
  ( $service_name, $service ) = split ( / \ s + /, $route );
  die "$date: $0: error: no route for the service:
$service (add
more) \n"
       unless $service;
       return $service;
}
sub switch_swervice {
  my ( $service ) = @_;
  my ( $service_name ) = split ( /_/, $service );
  print STDERR "$date: $0: attn.: changing priority for
service:
$service\n";
  # update priority
  &db_query ( "update mcServiceRoute "
    . "set priority = ( select max ( priority )
```

TABLE 3-continued

```
from
mcServiceRoute"
      . "where service = '$service_name' ) + 1,
"
      . "date = getdate ( ) "
      . "where route = '$script $service'") ;
#   print "---$route===\n";
    # find new route
    my $route = @ {$db_query ( "select route from
mcServiceRoute "
        . "where service =
'$service_name'"
          . "and attempt < 5
"
          . "order by priority ")
     } -> [0]{route };
   die " $date: $0: error: there is the only service:
$route (add
more) \n"
     if ( $route eq "$script $service"
        or $route eq "$script $service_stored") ;
    ( $service_name, $service ) = split ( / \s+/, $route );
   die "$date: $0: error: no route for the service:
$service (add
more) \n"
      nless $service;
      return $service;
} –
```

Table 4 below contains source code of the content fetcher 402 used with the content extraction agent 400 to retrieve information from a web site.

TABLE 4

```
# !/usr/local/www/bin/sybper15
# -T
# -w
# $Header:
/usr/local/cvsroote/Webley/agents/service/webget.pl,v 1.4
# Agent to get info from the web.
# Parameters: service_name [service_parameters], i.e. stock
msft or weather
60645
# Configuration stored in files service_name.ini
# if this file is absent the configuration is received from
mcServices table
# This script provides autoupdate to datatable if the .ini
file is newer.
$debug = 1;
use URI : : URL;
use LWP : : UserAgent;
use HTTP : : Request : : Common;
use Vail : : VarList;
use Sybase : : CTlib;
use HTTP : : Cookies;
#print "Sybase: : CTlib $DB_USER, $DB_PWD, $DB_SRV;";
open (STDERR, ">>$0.log" ) if $debug;
#open ( STDERR, ">&STDOUT" ) ;
$log = 'date';
#$response = './url.pl
http://cgi.cnn.com/cgi-bin/weather/redirect?zip=60605'";
#$response = 'pwd';
#print STDERR " ls = $response\n" ;
#$response = 'ls';
#print STDERR "ls = $response\n";
chop ( $log ) ;
$log .= "pwd=" . 'pwd';
chop ( $log );
#$debug2 = 1;
my $service = shift;
$log .= " $service: ". Join(' : ', @ARGV ) . "\n" ;
Print STDERR $log if $debug;
#$response = './url.pl
"/http://cgi.cnn.com/cgi-bin/weather/redirect?zip=60605" ';
my @ini = &read_ini ( $service );
chop ( @ini );
my $section = " " ;
do ($section = &process_section ( $section ) }while $section;
```

TABLE 4-continued

```
#$response = './url/pl
"http://cgi.cnn.com/cgi-bin/weather/redirect?zip=60605" ';
exit;
sub read_ini {
 my ( $service ) = @_;
 my @ini= ( );
 # first, try to read file
 $0 =~ m|^ (.*/) [^/]*|;
 $service = $1 . $service;
 if ( open ( INI, "$service.ini" ) ) {
   @ini = ( <INI> );
   return @ini unless ( $DB_SRV );
   # update datatable
   My $file_time = time − int ( ( -M "$service.ini" )
* 24*
3600 ) ;
   # print "time $file_time\n";
   my $dbh = new Sybase: : CTlib $DB_USR, $DB_PWD,
$DB_SRV;
   unless ( $dbh ) {
     print STDERR "webget.pl: Cannot connect to
dataserver $DB_SRV: $DB_USR: $DB_PWD\n";
     return @ini;
   }
   my @row_refs = $dbh ->ct_sql ( "select lastUpdate
from
mcServices where service = '$service' ", undef, 1 );
  if ($dbh -> RC } == CS_FAIL ) {
    print STDERR "webget.pl: DB select from
mcServices
failed\n";
    return @ini;
  }
  unless (defined @ row_refs ) {
  # have to insert
  my ( @ini_escaped ) = map {
    (my $x = $_ )=~ s/ \'/ \ '/ ' /g;
    $x;
  }@ini;
  $dbh-> ct_sql ( "insert mcServices values (
'$service',
'@ini_escaped', $file_time )" );
   if ( $dbh-> {RC } =- CS_FAIL ) {
     print STDERR "webget,pl: DB insert to
mcServices failed\n";
}
   return @ini;
  }
Print "time $file_time:".$row_refs [ 0 ]=
>{'lastUpdate'
}. "\n" ;
  if ( $file_time > $row_refs [0] => {'lastUpdate' })
{
    # have to update
    my ( @ini_escaped ) = map {
     (my $x = $_) =~s/ \'/ \'\'/g;
     $x;
    }@ini;
    $dbh->ct_sql ( "update mcServices set config =
'@ini_escaped', lastUpdate = $file_time where service =
'$service' " );
    if ( $dbh ->{RC } ==CS_FAIL ) {
      print STDERR "webget.pl: DB update to
mcServices failed\n";
    }
   }
   return @ini;
 }
 else {
  print STDERR "$0: WARNING: $service.ini n/a in" .
'pwd'
    . "Try to read DB\n";
 }
 # then try to read datatable
 die "webget.pl: Unable to find service $service\n"
unless ( $DB_SRV)
) ;
```

TABLE 4-continued

```
  my $ dbh = new Sybase : : CTlib $DB_USR, $DB_PWD, $DB_SRV;
  die "webgetlpl: Cannot connect to dataserver
$DB_SRV : $DB_USR: $DB_PWD\n" unless ( $dbh );
  my @row_refs = $dbh -> ct_sql ( "select config from
mcServices where
service = '$service' ", undef, 1);
  die "webget.pl: Unable to find service $service\n"
unless ( defined
@row_refs ) ;
  $row_refs [0] -> {'config' } =~ s/ \n / \n\r/g;
  @ini = split ( / \ r /, $row_refs [0] -> {'config' } );
  return @ini;
}
# # # # # # # # # # # # # # # # # # # # # # # # # # # # # # # # # # # # # # # # # # # #
# # # # # #
sub process_section {
  my ( $prev_section) = @_;
  my ( $section, $output, $content );
  my %Param;
  my %Content;
#  print"# # # # # # # # # # # # # # # # # # # \n";
  foreach ( @ini ) {
#    print;
#    chop;
    s/ \s+ $ / / ;
    s/ ^\s + //;
    # get section name
    if ( /^\ [(.*) / ] ) {
#      print "$_: $section:$prev_section\n";
      last if $section;
      next if $1 eq "print";
      next if $prev_section ne " " and $prev_section
ne $1;
      if ( $prev_section eq $1 ) {
        $prev_section = " "
        next;
      }
      $section = $1;
    }
    # get parameters
    push ( @{$Param{$1 }}, $2) if $section and
/ ([ ]=+) – (.*) / ;
  }
#  print" +++++++++++++++++++++++++++++++++\n";
  return 0 unless $section;
#  print "section $section\n";
  # substitute parameters with values
  map {$Param{URL } -> [0 ] =~ s/$Param{Input } ->[$_
] / $ARGV [$_
]/ g
  }0 .. $# {$Param{ Input } };
  # get page content
  ( $Content{'TIME' }, $content ) =&get_url_content (
${$ Param {URL
} } [0 ] ) ;
  # filter it
  map {
    if ( / \" ([ \"] + ) \ " ([ ^\"]*) \ "/ or
/ \ /([ \ / ] + )\ /([ \ /]*) \ / /)
    {
      my $out = $2; $content =~ s/$1/$out/g;
    }
  -}@{$Param {"Pre-filter" } };
# print STDERR $content;
  # do main regular expression
  unless ( @values = $content =~
/$ {$Param {Regular_expression } } [0
]/ ) {
    &die_hard ( ${$Param{Regular_expression } } [ 0 ],
$content
);
    return $section;
  }
  %Content = map {( $Param[Output } -> [ $_], $values [$_
] )
  }0 .. $# {$Param{Output }} ;
  # filter it
  map {
    if ( / ([ \"]+) \ "([ \"] +) \ = ([ \"] +)\ " /
or/([ \ /]+)\ /([ \ /] + )\ /([ \ /] * )\ //) {
```

TABLE 4-continued

```
  my $out = $3;
  $Content {$1 } =~ s/$2/$out/g;
  }
 _}@{Param {"Pre-filer" } };
# print STDERR $content;
 # do main regular expression
 unless ( @values = $content =~
/${$Param{Regular_expression } } [ 0
] / ) {
 &die_hard( ${$Param {Regular_expression}} [ 0 ],
$content
);
  return $section;
 }
 %Content= map { ( $Param{Output }->[ $_], $values [ $_
] )
 }0 .. $# {$Param {Output }};
 # filter it
 map {
  if(/ ([ \"] + )\ " ([ \"]+)\" ([ \ " ] * )\ " /
   or/([ \ /] + )\ /([ \ / + )\ /([ \ /] * ) \ / / ){
   my $out = $3;
   $Content {$1 } =~ s/$2/$out/g;
  }
 }@{$Param{"Post-filter" } };
 # calculate it
 map {
  if{ /( [ ^=] + ) = (.*) / ){
   my $eval = $2;
   map {$eval =~ s/$_/$Content {$ _ } / g
   } keys %Content;
   $Content {$1 } = eval ($eval ) ;
  }
 }@{$Param{Calculate }};
# read section [print]
foreach $i ( 0 . . $#ini ) {
 next unless $ini [ $i ] =~ / ^\ [print \ ]/;
 foreach ( $i + 1 . . $ #ini ) {
   last if $ini [ $_] =~ / ^\ [.+\]/;
   $output .= $ini [ $_] . "\n";
 }
 last;
}
# prepare output
map {$output =~ s/$Content{$_} / g
}keys %Content;
print $output;
-return 0;
}
#################################################

sub get_url_content {
 my ( $url ) = @_;
 print STDERR $url if $debug;
 # $response='./url.pl'$url';
 $response='./url.pl '$url';
 return( $time - time, $response );
 my $ua = LWP: :UserAgent->new;
 $ua->agent ( 'Mozilla/4.0 [en] (X11; I; freeBSD 2.2.8-
STABLE i386)'
 ) ;
# $ua->proxy( ['http', 'https'],
'http://proxy.webley:3128/') ;
# $ua->no_proxy( 'webley', 'vail' );
 my $cookie= HTTP::Cookies->new;
 $ua->cookie_jar( $cookie ) ;
 $url = url $url;
  print "$url \n" if $debug2;
 my $time = time;
 my $res= $ua->request( GET $url ) ;
 print "Response: " . ( time - $time "sec\n" if
$debug2;
 return ( $time - time, $res->content ) ;
}]
#################################################

sub die_hard {
 my ( $re, $content ) = @_;
 my ( $re_end, $pattern ) ;
```

TABLE 4-continued

```
while ( $content !~ /$re/ ) {
  if ($re =~ s/(\(["\(\))]+\) ["\(\) | *$) / / ) {
    $re_end = $1 . $re_end;
  }
  else {
    $re_end = $re;
    last;
  }
}
$content =~ /$re/;
Print STDERR "The regular expression did not match:\n
$ re\n
Possible misuse:
$re end: \n
Matched:
$&\n
Mismatched:
$'\n
"if $debug;
  if ( $debug ) {
    print STDERR "Content: \n $content\n" unless
$'; -
  }
}
```
#########################################

Table 5 below contains the content descriptor file source code for obtaining weather information from the web site www.cnn.com that is used by the extraction agent 400 of the preferred embodiment.

TABLE 5

[cnn]
Input=_zip
URL=http://cgi.cnn.com/cgi-bin/weather/redirect?zip=_zip
Pre-filter="\n" "
Pre-filter="<[^< >]+>""
Pre-filter=/ \s+/ /
Pre-filter=" [\ ( \) \ | ] " !"
Output=_location
Output=first_day_name
Output=first_day_weather
Output=first_day_ high_F
Output=first_day_high_C
Output=first_day_low_F
Output=first_day_low_C
Output=second_day_name
Output=second_day_weather
Output=second_day_high_F
Output=second_day_high_C
Output=second_day_low_F
Output=second_day_low_C
Output=third_day_name
Output=third_day_weather
Output=third_day_high_F
Output=third_day_high_C
Output=third_day_low_F
Output=third_day_low_C
Output=fourth_day_name
Output=fourth_day_weather
Output=fourth_day_high_F
Output=fourth_day_high _C
Output=fourth_day_low_F
Output=fourth_day_low_C
Output=undef
Output=_current_time
Output=_current_month
Output=_current_day
Output=_current_weather
Output=_current_temperature_F
Output=_current_temperature_C
Output=_humidity
Output=_wind
Output=_pressure
Output=_sunrise TABLE 5-continued Output=_sunset
Regular_expression=Author  (.+) Four Day Forecast
(\S+) (\S+) HIGH
(\S+) F (\S+) C LOW (\S+) F (\S+) C (\S+) (\S+) HIGH (\S+) F
( \S+) C LOW
(\S+) F (\S+) C (\S+) (\S+) HIGH (\S+) F (\S+) C LOW (\S+) F
(\S+) C (\S+)
(\S+) HIGH (\S+) F (\S+J C LOW (\S+) F (\S+) C ( .+) Current
Conditions (. +)
! local !, (\S+) (\S+) (. t) Temp: (\S+) F, (\S+) C Rel.
Humidity: ( \S+) Wind:
(. +) Pressure: ( .+) Sunrise: ( .+) Sunset: ( .+) Related Links
Post-filter=_current_weather"p/" partly "
Post-filter=_current weather"l/"little "
Post-filter=_current weather"m/"mostly "
Post-filter=_current weather"t-/"thunder"-
Post-filter=_wind"N"North"
Post-filter=_wind"E"East "
Post-filter=_wind"S"South "--
Post-filter=_wind"W"West fl
Post-filter=_wind/mph/miles per hour/
Post-filter=_wind/kph!/kilometers per hour/
Post-filter=_wind"\s+ !", "
[print]
Current weather in_location is_current_weather.
Temperature is_current_temperature_F Fahrenheit,
_current_temperature_C
Celsium.
Humidity is_humidity.
Wind from the_wind.

Table 6 below contains the content descriptor file source code for obtaining weather information from the web site www.lycos.com that is used by the extraction agent 400 of the preferred embodiment.

TABLE 6

[lycos]
Input=zip
Input=_city
URL=http://weather.lycos.com/wcfiveday.asp?city=zip
Pre-filter="\n" "
Pre-filter="</TD>"td"
Pre-filter="<!.*?->""
Pre-filter="<br>"_br_"
Pre-filter=/alt="/>alt=/

TABLE 6-continued

```
Pre-filter="<[^< >]+>""
Pre-filter=" " " "
Pre-filter=/ \s+/ /
Output=_location
Output=_current_weather
Output=_current_temperature_F
Output=_humidity
Output=_winddir
Output=_windspeed
Output=_windmeasure
Output=_pressure
Output=first_day_name
Output=second_day_name
Output=third_day_name
Output=fourth_day_name
Output=fifth_day_name
Output=first_day_weather
Output=second_day_weather
Output=third_day_weather
Output=fourth_day_weather
Output=fifth_day_weather
Output=first_day_high_F
Output=first_day_low_F
Output=second_day_high_F
Output=second_day_low_F
Output=third_day_high_F
Output=third_day_low_F
Output=fourth_day_high_F
Output=fourth_day_low_F
Output=fifth_day_high_F
Output=fifth_day_low_F
Output=_windkmh
Regular expression=Guide My Lycos (.+) Click image to
enlarge
alt=([ "]+) " (?:.+) Temp: (\(d+) (?:.+)F_br_Humidity:
(\S+) (?: .+) Wind: ( .+?)
_br_
Output=_current temperature_C
Post-filter=_location"_br_""
Post-filter=_current_weather"p/"partly "
Post-filter=_current_weather"m/"mostly "
Post-filter=_current weather"t-/"thunder "
Post-filter=_winddir"@" at"
Post-filter=_winddir/mph/miles per hour/
Post-filter=_wind/kph!/kilometers per hour/
Calculate=_current_temperature_C=int ( (_current_temperature_F
-32) * 5/9)
Calculate=_windkmh=int(_windspeed*1.6)
[print]
The current weather in_location is_current_weather.
The current temperature is_current_temperature_F_Farenheit
_current_temperature_C Celcius.
Humidity is _humidity.
Winds_winddir.
```

Once the web browsing server 102 accesses the web site specified in the URL 204 and retrieves the requested information, the information is forwarded to the media server 106. The media server uses the speech synthesis engine 302 to create an audio message that is then transmitted to the user's voice enabled device 112. In the preferred embodiment, each web browsing server 102 is based upon Intel's Dual Pentium III 730 MHz microprocessor system.

Referring to FIG. 1, the operation of the robust voice browser system will be described. A user establishes a connection between his voice enabled device 112 and a media server 106. This may be done using the Public Switched Telephone Network (PSTN) 116 by calling a telephone number associated with the voice browsing system 118. Once the connection is established, the media server 106 initiates an interactive voice response (WR) application 304. The IVR application plays audio messages to the user presenting a list of options, such as, "stock quotes", "flight status", "yellow pages", "weather", and "news". These options are based upon the available web site categories and may be modified as desired. The user selects the desired option by speaking the name of the option into the voice enabled device 112.

As an example, if a user wishes to obtain restaurant information, he may speak into his telephone the phrase "yellow pages". The FIR application would then ask the user what he would like to find and the user may respond by stating "restaurants". The user may then be provided with further options related to searching for the desired restaurant. For instance, the user may be provided with the following restaurant options, "Mexican Restaurants", "Italian Restaurants", or "American Restaurants". The user then speaks into the telephone 112 the restaurant type of interest. The IVR application running on the media server 106 may also request additional information limiting the geographic scope of the restaurants to be reported to the user. For instance, the IVR application may ask the user to identify the zip code of the area where the restaurant should be located. The media server 106 uses the speech recognition engine 300 to interpret the speech commands received from the user. Based upon these commands, the media server 106 retrieves the appropriate web site record 200 from the database 100. This record and any additional data, which may include other necessary parameters needed to perform the user's request, are transmitted to a web browsing server 102. A firewall 104 may be provided that separates the web browsing server 102 from the database 100 and media server 106. The firewall provides protection to the media server and database by preventing unauthorized access in the event the firewall for web browsing server 108 fails or is compromised. Any type of firewall protection technique commonly known to one skilled in the art could be used, including packet filter, proxy server, application gateway, or circuit-level gateway techniques.

The web browsing server 102 then uses the web site record and any additional data and executes the extraction agent 400 and relevant content descriptor file 406 to retrieve the requested information.

The information received from the responding web site 114 is then processed by the web browsing server 102 according to the content descriptor file 406 retrieval by the extraction agent. This processed response is then transmitted 30 to the media server 106 for conversion into audio messages using either the speech synthesis software 302 or selecting among a database of prerecorded voice responses contained within the database 100.

As mentioned above, each web site record contains a rank number 202 as shown in FIG. 2. For each category searchable by a user, the database 100 may list several web sites, each with a different rank number 202. As an example, three different web sites may be listed as searchable under the category of "restaurants". Each of those web sites will be assigned a rank number such as 1, 2, or 3. The site with the highest rank (i.e., rank=1) will be the first web site accessed by a web browsing server 102. If the information requested by the user cannot be found at this first web site, then the web browsing server 102 will search the second ranked web site and so forth down the line until the requested information is retrieved or no more web sites left to check.

The web site ranking method and system of the present invention provides robustness to the voice browser system and enables it to adapt to changes that may occur as web sites evolve. For instance, the information required by a web site 114 to perform a search or the format of the reported response data may change. Without the ability to adequately monitor and detect these changes, a search requested by a user may provide an incomplete response, no response, or an error. Such useless responses may result from incomplete data being provided to the web site 114 or the web browsing server 102 being unable to recognize the response data messages received from the searched web site 114.

The robustness and reliability of the voice browsing system of the present invention is further improved by the addition of a polling mechanism. This polling mechanism continually polls or "pings" each of the sites listed in the database 100. During this polling function, a web browsing server 102 sends brief data requests or "polling digital data" to each web site listed in database 100. The web browsing server 102 monitors the response received from each web site and determines whether it is a complete response and whether the response is in the expected format specified by the content descriptor file 406 used by the extraction agent 400. The polled web sites that provide complete responses in the format expected by the extraction agent 400 have their ranking established based on their "response lime". That is, web sites with faster response times will be will be assigned higher rankings than those with slower response times. If the web browsing server 102 receives no response from the polled web site or if the response received is not in the expected format, then the rank of that web site is lowered. Additionally, the web browsing server contains a warning mechanism that generates a warning message or alarm for the system administrator indicating that the specified web site has been modified or is not responsive and requires further review.

Since the web browsing servers 102 access web sites based upon their ranking number, only those web sites that produce useful and error-free responses will be used by the voice browser system to gather information requested by the user. Further, since the ranking numbers are also based upon the speed of a web site in providing responses, only the most time efficient sites are accessed. This system assures that users will get complete, timely, and relevant responses to their requests. Without this feature, users may be provided with information that is not relevant to their request or may not get any information at all. The constant polling and reranking of the web sites used within each category allows the voice browser of the present invention to operate efficiently. Finally, it allows the voice browser system of the present invention to dynamically adapt to changes in the rapidly evolving web sites that exist on the Internet.

It should be noted that the web sites accessible by the voice browser of the preferred embodiment may use any type of mark-up language, including Extensible Markup Language (XML), Wireless Markup Language (WML), Handheld Device Markup Language (HDML), Hyper Text Markup Language (HTML), or any variation of these languages.

Figure 5:
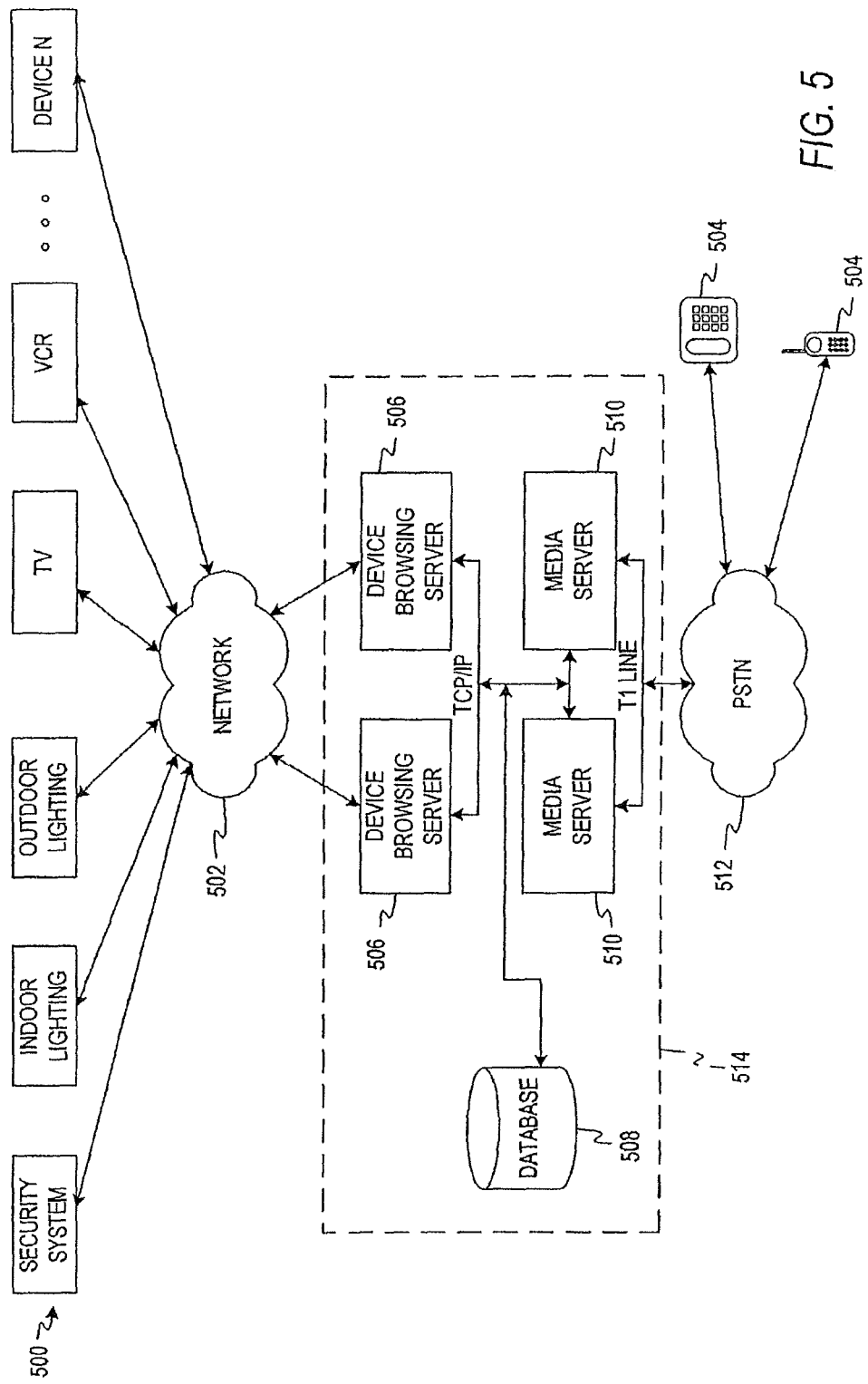
FIG. 5 is a depiction of the device browsing system of the second embodiment of the present invention.

A second embodiment of the present invention is depicted in FIG. 5. This embodiment provides a system and method for controlling a variety of devices 500 connected to a network 502 by using conversational speech commands spoken into a voice enabled device 504 (i.e., wireline or wireless telephones, Internet Protocol (EP) phones, or other special wireless units). The networked devices may include various household devices. For instance, voice commands may be used to control household security systems, VCRs, TVs, outdoor or indoor lighting, sprinklers, or heating and air conditioning systems.

Each of these devices 500 is connected to a network 502. These devices 500 may contain embedded microprocessors or may be connected to other computer equipment that allow the device 500 to communicate with network 502. In the preferred embodiment, the devices 500 appear as "web sites" connected to the network 502. This allows a network interface system, such as a device browsing server 506, a database 508, and a user interface system, such as a media server 510, to operate similar to the web browsing server 102, database 100 and media server 106 described in the first preferred embodiment above. A network 502 interfaces with one or more network interface systems, which are shown as device browsing servers 506 in FIG. 5. The device browsing servers perform many of the same functions and operate in much the same way as the web browsing servers 102 discuss above in the first preferred embodiment. The device browsing servers 506 are also connected to a database 508.

Database 508 lists all devices that are connected to the network 502. For each device 500, the database 508 contains a record similar to that shown in FIG. 2. Each record will contain at least a device identifier, which may be in the form of a URL, and a command to "content extraction agent" contained in the device browsing server 506. Database 508 may also include any other data or software necessary to test and administer the device browsing system.

The content extraction agent operates similarly to that described in the first embodiment. A device descriptor file contains a listing of the options and functions available for each of the devices 500 connected on the network 502. Furthermore, the device descriptor file contains the information necessary to properly communicate with the networked devices 500. Such information would include, for example, communication protocols, message formatting requirements, and required operating parameters.

The device browsing server 506 receives messages from the various networked devices 500, appropriately formats those messages and transmits them to one or more media servers 510 which are part of the device browsing system. The user's voice enabled devices 504 can access the device browsing system by calling into a media server 510 via the Public Switched Telephone Network (PSTN) 512. In the preferred embodiment, the device browsing server is based upon Intel's Dual Pentium III 730 MHz microprocessor system.

The media servers 510 act as user interface systems and perform the functions of natural speech recognition, speech synthesis, data processing, and call handling. The media server 510 operates similarly to the media server 106 depicted in FIG. 3. When data is received from the device browser server 506, the media server 510 will convert the data into audio messages via a speech synthesis engine that are then transmitted to the voice enabled device of the user 504. Speech commands received from the voice enabled device of the user 504 are converted into data messages via a speech recognition engine running on the media server 510. A preferred speech recognition engine is developed by Nuance Communications of 1380 Willow Road, Menlo Park, Calif. 94025 (www.nuance.com). A preferred speech synthesis engine is developed by Lernout and Hauspie Speech Products, 52 Third Avenue, Burlington, Mass. 01803 (www.lhsl.com). The media servers 510 of the preferred embodiment are based on Intel's Dual Pentium III 730 MHz microprocessor system. A specific example for using the system and method of this embodiment of the invention will now be given.

First, a user may call into a media server 510 by dialing a telephone number associated with an established device browsing system. Once the user is connected, the IVR application of the media server 510 will provide the user with a list of available systems that may be monitored or controlled based upon information contained in database 508.

For example, the user may be provided with the option to select "Home Systems" or "Office Systems". The user may then speak the command "access home systems". The media server 510 would then access the database 508 and provide the user with a listing of the home subsystems or devices 500 available on the network 502 for the user to monitor and control. For instance, the user may be given a listing of subsystems such as "Outdoor Lighting System", "Indoor Lighting System", "Security System", or "Heating and Air Conditioning System". The user may then select the indoor lighting subsystem by speaking the command "Indoor Lighting System". The IVR application would then provide the user with a set of options related to the indoor lighting system. For instance the media server 510 may then provide a listing such as "Dining Room", "Living Room", "Kitchen", or "Bedroom". After selecting the desired room, the IVR application would provide the user with the options to hear the "status" of the lighting in that room or to "turn on", "turn off", or "dim" the lighting in the desired room. These commands are provided by the user by speaking the desired command into the users voice enabled device 504. The media server 510 receives this command and translates it into a data message. This data message is then forwarded to the device browsing server 506 which routes the message to the appropriate device 500.

The device browsing system 514 of this embodiment of the present invention also provides the same robustness and reliability features described in the first embodiment. The device browsing system 514 has the ability to detect whether new devices have been added to the system or whether current devices are out-of-service. This robustness is achieved by periodically polling or "pinging" all devices 500 listed in database 508. The device browsing server 506 periodically polls each device 500 and monitors the response. If the device browsing server 506 receives a recognized and expected response from the polled device, then the device is categorized as being recognized and in-service. However, if the device browsing server 506 does not receive a response from the polled device 500 or receives an unexpected response, then the device 500 is marked as being either new or out-of-service. A warning message or a report may then be generated for the user indicating that a new device has been detected or that an existing device is experiencing trouble.

Therefore, this embodiment allows users to remotely monitor and control any devices that are connected to a network, such as devices within a home or office. Furthermore, no special telecommunications equipment is required for users to remotely access the device browser system. Users may use any type of voice enabled device (i.e., wireline or wireless telephones, IP phones, or other wireless units) available to them. Furthermore, a user may perform these functions from anywhere without having to subscribe to additional services. Therefore, no additional expenses are incurred by the user.

The descriptions of the preferred embodiments described above are set forth for illustrative purposes and are not intended to limit the present invention in any manner. Equivalent approaches are intended to be included within the scope of the present invention. While the present invention has been described with reference to the particular embodiments illustrated, those skilled in the art will recognize that many changes and variations may be made thereto without departing from the spirit and scope of the present invention. These embodiments and obvious variations thereof are contemplated as falling within the scope and spirit of the claimed invention.

What is claimed is:

1. A system for acquiring information from one or more sources maintaining a listing of web sites by receiving speech commands uttered by users into a voice-enabled device and for providing information retrieved from the web sites to the users in an audio form via the voice-enabled device, the system comprising:
   at least one computing device, the computing device operatively coupled to one or more networks;
   at least one speaker-independent speech-recognition device, the speaker-independent speech-recognition device operatively connected to the computing device and configured to receive the speech commands;
   at least one speech-synthesis device, the speech-synthesis device operatively connected to the computing device;
   memory operatively associated with the computing device with at least one instruction set for identifying the information to be retrieved, the instruction set being associated with the computing device, the instruction set comprising:
   a plurality of web site addresses for the listing of web sites, each web site address identifying a web site containing the information to be retrieved;
   at least one recognition grammar associated with the computing device, each recognition grammar corresponding to each instruction set and corresponding to a speech command, the speech command comprising an information request provided by the user, the speaker-independent speech-recognition device configured to receive the speech command from the users via the voice-enabled device and to select the corresponding recognition grammar upon receiving the speech command;
   the computing device configured to retrieve the instruction set corresponding to the recognition grammar provided by the speaker-independent speech-recognition device;
   the computing device further configured to access at least one of the plurality of web sites identified by the instruction set to obtain the information to be retrieved, wherein the computing device is further configured to periodically search via the one or more networks to identify new web sites and to add the new web sites to the plurality of web sites, the computing device configured to access a first web site of the plurality of web sites and, if the information to be retrieved is not found at the first web site, the computer configured to access the plurality of web sites remaining in an order defined for accessing the listing of web sites until the information to be retrieved is found in at least one of the plurality of web sites or until the plurality of web sites have been accessed;
   the speech synthesis device configured to produce an audio message containing any retrieved information from the plurality of web sites, and
   the speech synthesis device further configured to transmit the audio message to the users via the voice-enabled device.

2. The system of claim 1, wherein the one or more networks include the Internet.

3. The system of claim 1, wherein the one or more networks include a local-area network.

4. The system of claim 1, wherein the voice-enabled device is at least one of a standard telephone, an IP telephone, a cellular phone, a PDA, a personal computer, a DVD player, a television or other video display device, a CD player, a MP3 player, and any other device capable of transmitting the audio message.

5. The system of claim 1, wherein the speaker-independent speech recognition device is configured to analyze phonemes to recognize the speech commands.

6. The system of claim 1, wherein the speaker-independent speech-recognition device is configured to recognize naturally spoken speech commands.

7. The system of claim 1, wherein the instruction set further comprises: a content descriptor associated with each web site address, the content descriptor pre-defining a portion of the web site containing the information to be retrieved.

8. The system of claim 1, wherein the computing device is further configured to periodically poll each of the web sites without being instructed by the user to determine at least one or more of 1) the availability of each web site, 2) the duration of time for each web site to respond to a request from the computing device, and changes to the location of the information to be retrieved from each web site, the computing device further configured to create the order of access to the plurality of web sites based on the periodic polling.

9. The system of claim 1, wherein the computing device is configured to search each of the new web sites without being instructed by the user to determine the availability of each new web site, the duration of time for each new web site to respond to a request from the computer, and changes to the location of the information to be retrieved from each new web site, the computing device further configured to create an order for access to the plurality of new web sites based on the periodic searches.

10. The system of claim 1, wherein the instruction set further comprises a pre-defined order of access associated with each web site address, the pre-defined order of access indicating the order in which the plurality of web sites are accessed.

11. The system of claim 10, wherein the computing device is configured to modify the pre-defined order for access to a particular web site, based upon at least one of a plurality of criteria, the plurality of criteria comprising: 1) the availability of each web site; 2) the duration of time for each web site to respond to a request from the computing device; and 3) changes to the location of the information to be retrieved from each web site.

12. The system of claim 11, wherein the computing device is configured to weigh the criteria with respect to one another when modifications to the pre-defined order for access are based on more than one of the plurality of criteria.

13. The system of claim 12, wherein the computing device is configured to access the plurality of web sites in the order pre-defined to retrieve the information requested by the user, the computing device further configured to access first the web site that is highest in the order pre-defined.

14. The system of claim 1, further comprising:
a database operatively connected to the computing device, the database configured to store the information gathered from the web sites in response to the information requests.

15. The system of claim 14, wherein each recognition grammar and each instruction set are stored in the database.

* * * * *

(12) INTER PARTES REVIEW CERTIFICATE (3337th)

United States Patent
Kurganov et al.

(10) Number: US 9,451,084 K1
(45) Certificate Issued: Dec. 1, 2023

(54) ROBUST VOICE BROWSER SYSTEM AND VOICE ACTIVATED DEVICE CONTROLLER

(75) Inventors: Alexander Kurganov; Valery Zhukoff

(73) Assignee: PARUS HOLDINGS, INC

Trial Numbers:

IPR2020-00687 filed Mar. 18, 2020
IPR2020-00847 filed Apr. 18, 2020

Inter Partes Review Certificate for:

Patent No.: 9,451,084
Issued: Sep. 20, 2016
Appl. No.: 13/462,819
Filed: May 3, 2012

The results of IPR2020-00687 and IPR2020-00847 are reflected in this inter partes review certificate under 35 U.S.C. 318(b).

INTER PARTES REVIEW CERTIFICATE
U.S. Patent 9,451,084 K1
Trial No. IPR2020-00687
Certificate Issued Dec. 1, 2023

AS A RESULT OF THE INTER PARTES REVIEW PROCEEDING, IT HAS BEEN DETERMINED THAT:

Claim 3 is found patentable.

Claims 1, 2, 4-7, 10 and 14 are cancelled.

\* \* \* \* \*